May 20, 1924.
E. S. BREMERMAN
AUTOMOBILE LOADING
Filed March 24, 1919    2 Sheets-Sheet 1
1,495,130
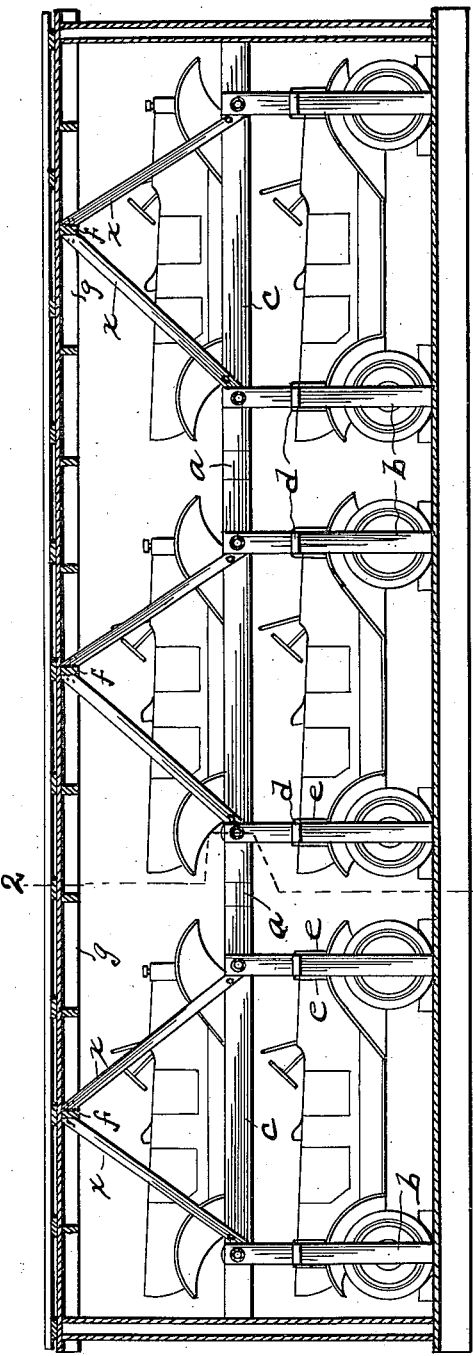
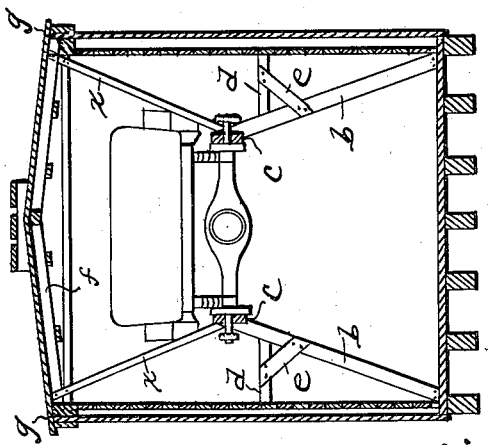
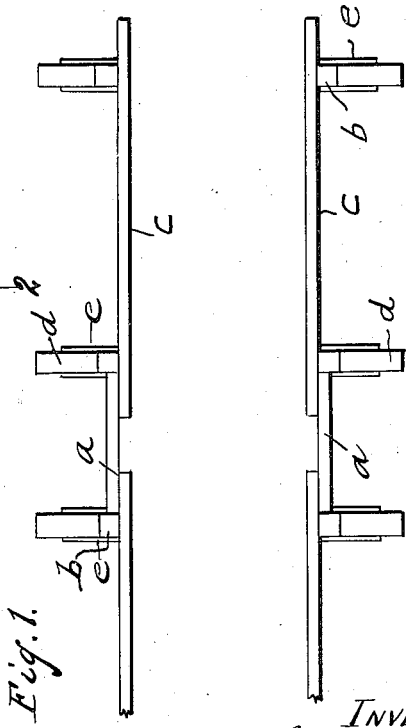
INVENTOR
Eugene S. Bremerman
BY
Stuart C. Barnes
ATTORNEY.

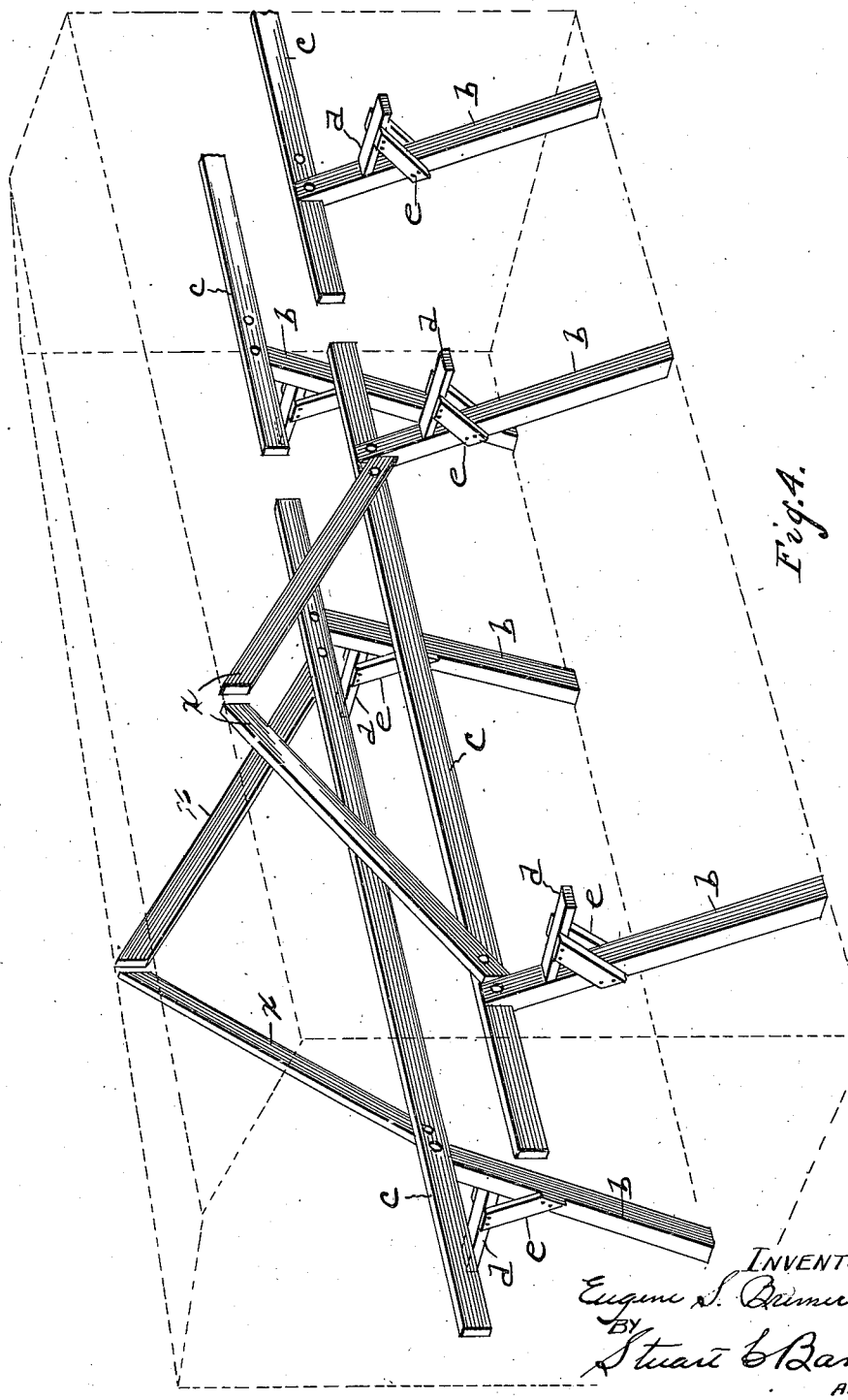

Patented May 20, 1924.

1,495,130

UNITED STATES PATENT OFFICE.

EUGENE S. BREMERMAN, OF DETROIT, MICHIGAN.

AUTOMOBILE LOADING.

Application filed March 24, 1919. Serial No. 284,676.

*To all whom it may concern:*

Be it known that I, EUGENE S. BREMERMAN, a citizen of the United States, residing at Detroit, county of Wayne, State of Michigan, have invented a new and useful Improvement in Automobile Loading, of which the following is a specification.

This invention relates to the loading of freight cars with automobiles. It has been found extremely difficult to cheaply load automobiles in freight cars in such a way that they will be transported safely to their destination. A great many so-called systems of loading have been adopted by various manufacturers but they are all open to various objections.

Among the systems quite frequently used is one which involves a triangular brace usually nailed to the side of the car. This triangular brace construction effects economy in the use of materials but is not well calculated to withstand the heavy bumps freight cars get. These freight cars are now quite universally distributed to the various trains that are being made up by being hauled over what is known as "the hump" in a freight yard. This is quite a heavy elevation of the track at the head of a great many branches for the purpose of distributing cars in making up trains. The engine hauls the cars up over the hump and then shunts them down these branch lines where they smash into the car already there sometimes going at as high a speed as twenty miles an hour. This system of switching is calculated to damage the contents of any car that is not well loaded. Obviously bumps of this character impose a very heavy end thrust of the automobiles relative to the freight car. A short brace supported only on the side of the car, even though a triangular brace, is calculated to and does pull the nails out of the car side and the brace becomes useless. This not only renders the brace useless but the frequent nailing of the brace to the sides of the car tends to tear the sides. A result that occurs when a freight car is given a severe bump is the tendency of the sides of the bar to bulge out. This tends to pull either the side of the car away from the brace of the triangular form or pull the brace itself away from the automobile axle. Another result that almost inevitably follows in the hard bumping of a freight car, and which has been little recognized, is the floor of the car has a tendency to rise or buckle, carrying the contents of the car upward with it. So far as I know, no effort has been made to brace against this action of the freight car.

Another feature which present systems of loading have not accounted for is the fact that occasionally the lower automobile in a load becomes loose and knocks the leg out from under the decked load. The skeleton work described in this application will support the load although one or more legs are knocked out from under it.

In fact, the various systems of loading which depend upon various forms of braces have been so unsatisfactory that most manufacturers have gone back to what is known as "staging," what in substance amounts to the building of a platform in the middle of the car to support the upper line of automobiles. This is a skeleton construction but is laid very similar to a platform. This construction requires a great deal of lumber and a large amount of labor, and hence is relatively expensive.

It is the object of my invention to introduce a method and a skeleton work for loading that utilizes a minimum amount of lumber but yieldably braces the cars in all four directions of possible movement. Furthermore, the frame for suspending one automobile braces the automobile frame adjacent to it so that the frames are all tied together to support each other. A further advantage of my skeleton work is that it is calculated to do practically no injury to the freight car itself as there is no nailing to the thin boarding at the sides or ends of the freight car.

In the drawings,—

Fig. 1 is a longitudinal section of a freight car showing it loaded in accordance with my system.

Fig. 2 is a cross section thereof.

Fig. 3 is a fragmentary plan view of the lower part of the skeleton work showing how the individual frames are joined together.

Fig. 4 is a perspective of part of the skeleton work before the individual frames are tied together. The freight car is partially shown in phantom lines.

The idea of the support, simply stated, is to support each of the upper automobiles upon a vertically and longitudinally split horse, the automobile itself serving to tie the two portions of the horse together at the top. The three horse frames are tied together at their ends by nailing them together by overlapping boards $a$, and the outer ends of the two end horse frames abut against the ends of the car but need not be nailed thereto. The split horse frame comprises simply the two usual inclined legs $b$ joined by the ridge beam $c$ at the top. Two ridge beams can be adapted to support an automobile and this pair of beams will be called a "cradle". A hole is bored through each beam $c$ and the top of the inclined leg $b$ to receive the ends of the automobile axle. The axle nuts are replaced after the axles have been placed in position through the ridge beams $c$ and the legs $b$, so that the two parts of the horse are tied together and held in place by them in addition to the struts $d$. Struts $d$ are interposed between the upper portions of the inclined legs $b$ and the sides of the car and inclined braces $e$ nailed onto the sides of the struts and the inclined legs $b$ to hold the struts in place. No nailing to the sides of the car is required and hence no damage is done to the car in this particular. The boarding at the side of the car is usually one inch stuff and is ill calculated to retain nails with the type of brace such as a triangular brace and which is subjected to what might be called heavy torsional strains tending to turn the triangular brace and pull out the nails. The inclined legs $b$ of the horse may be toe-nailed into the relatively heavy boarding of the floor at the corner of the flooring and the sides of the car.

It will be obvious that these inclined legs of the split horse form an effective suspension for the upper row of cars and also tend to brace the cars from sidewise movement in the freight car, especially when the struts $d$ are added, which form an effective barrier against objectionable sidewise movement. End thrust of the automobiles, which is possibly the most serious phase of movement in a freight car, is most effectively taken care of by joining the beams of adjacent horse frames so that the ends of the lines of beams both abut against the ends of the cars to stop this objectionable end thrust.

The tendency of the cars to rise in the freight car in obedience to the tendency of the floor to rise when the end of the car is severely bumped is very effectively taken care of by the inverted V frames $x$ utilized, two for each horse frame. The lower ends of these oblique bracing beams that form the V are preferably bolted to the beams $c$ of the horse frame. The upper ends are sawed obliquely to abut against the carlines $f$ of the car, when it is found of advantage to do so, and are nailed to the large side plates $g$ which run along under the roof at the sides of the cars. Not only do these V frames brace against this rising tendency but it will be obvious that they also materially assist in the resistance of the end thrust and also very materially assist in preventing the sidewise movement of the automobile. They also are most useful in suspending the automobile in case one or more of the legs are knocked out by the automobile underneath becoming loose.

The parts and the entire supporting skeleton have this very marked advantage over preceding system: A certain amount of resilience is afforded by reason of the length of most of the braces in the skeleton work; a certain amount of bending and yielding takes place in the skeleton work, absorbing the strains before they are communicated to the car or to the nails that attach the skeleton work to the freight car. This is quite an important feature for if braces that are nailed to the car are short they will scarcely yield any when subjected to strain but act as rigid transmitters of the strain to the nails, which are thereby drawn out of the freight car. It will be observed that only the inclined legs $b$ and the V braces are nailed to the car. These, as already observed, are relatively long yieldable members which can yield to some extent when subjected to such stresses as tend to wrench them in a fashion to draw up the nails.

The freight car is loaded by first suspending the top automobiles at the ends of the car by means of chain blocks. The split horse frame is then built around the car at each end of the freight car. The V braces may then be placed when the skeleton frame (and we will refer to that portion of the skeleton work that embodies one split horse frame and one pair of V braces as a skeleton frame) has been completed at each end of the car. The automobile that is to rest below the one suspended at each end is then brought in under the split horse and the wheels securely braced in place by any suitable braces. The middle upper car is then suspended by chain blocks. The under car is then placed and the skeleton frame consisting of the split horse and the two V braces are built around it. This having been done, the ridge beams $c$ of each skeleton frame may be braced together by the overlapping board $a$, making an end to end brace the length of the car.

Simply, to let it be known what I have found as the best stock to be used for a 40 ft. freight car, I mention that the legs $b$ are 65" x 4" x 4"; the ridge beams $c$ 12' x 2" x 6"; the struts $d$ 2' x 2" x 4"; the braces $e$ 1' x 4" x 2" and the V braces $x$ 6' x 2" x 6".

From the foregoing description it will be seen that I have provided a rigid supporting frame or structure extending lengthwise of the freight car for supporting a plurality of automobiles, and which structure also embraces a plurality of automobiles. The supporting frame is composed of a plurality of "cradles" or units arranged with their length longitudinally of the car, said units being connected or braced to one another at appropriate intervals. The units or "cradles" consist of the two parts of a split-horse spaced apart, or a pair of rectangular frames arranged side-by-side transversely of the car. Other bracing members may be added to withstand vertical thrust, and aid in the support of the suspended series of automobiles.

What I claim is:

1. The method of loading freight cars with automobiles, which comprises the supporting of the automobile between the axles and the floor of the freight car, the bracing of the automobile at each end of the freight car to take end thrust, and the bracing of the automobile between the same and the roof of the freight car against upward thrust.

2. A structure for loading freight cars with automobiles, having in combination, a pair of horse frames which, in effect form a longitudinally split horse supporting at the top an automobile which acts as a tie for the horse portions, and bracing between the two horse frames and the top of the freight car.

3. A structure for loading freight cars with automobiles, having in combination, a pair of horse frames which are in effect a longitudinally split horse joined at the top by the automobile which they support, and braces running from the ends of the horse frames to the corners of the top and side walls of the freight car.

4. A structure for loading freight cars with automobiles, having in combination, a pair of horse frames which are in effect a longitudinally split horse supporting at their tops an automobile which ties the split horse portions together, and a pair of V braces, one secured to each horse portion and bracing the same with the roof of the car.

5. A structure for loading freight cars with automobiles, having in combination, a plurality of horse frames arranged in pairs of which each pair forms in substance a longitudinally split horse, the split portions being joined at the top by the automobile which they support, said horse frames being joined together end to end and abutting against the end of the freight car.

6. A structure for loading freight cars with automobiles, having in combination, supports adapted to be mounted on the floor of a freight car having means for receiving the automobile axles, oblique braces extending between the automobile axles and the roof of the car for bracing against upward thrust, and braces between the supports and car sides, substantially as described.

7. A structure for loading freight cars with automobiles, having in combination, means for supporting an automobile between the axles and the freight car floor, and oblique braces between the axles and the corners of the top of the freight car and the side walls for bracing against upward thrust, the said ends of the oblique braces abutting against the carlines of the car.

8. A structure for loading freight cars with automobiles, comprising means for supporting a car above the floor of the freight car and V braces for bracing against upward thrust, one on each side of the automobile connecting the axles with the corners of the top and sides of the freight car.

9. A structure for loading freight cars with automobiles, comprising a skeleton work embodying braces that are nailable to the corners of the floor and the side walls of the freight car and the corners of the side walls and the top of the car and braces which only abut against the end walls and side walls of the car.

10. A structure for loading freight cars with automobiles, comprising a skeleton work having legs which support the skeleton work at the bottom, and suspension and bracing members which are capable of supporting the skeleton work in case one or more of the legs are disabled and also bracing against upward thrust.

11. A structure for loading freight cars with automobiles, having in combination, a skeleton work embracing beams running longitudinally of the car and supporting a car by its axles, and inclined legs bracing the beams from the corners of the floor and side walls of the freight car and connected together by the said longitudinally running beams.

12. A structure for loading freight cars with automobiles, having in combination, a skeleton work embracing longitudinally running beams for supporting the car axles, legs for under-supporting the longitudinally running beams, and suspension members for supporting the beams from above.

13. A structure for loading freight cars with automobiles, comprising a skeleton work forming a longitudinally running cradle substantially the width of the automobile, inclined legs running from the sides of the cradle to the corners and side walls of the freight car, and inclined braces running from the sides of the cradle to the corners of the roof and side walls of the freight car.

14. The system of means for decking automobiles one above another in a plurality of rows extending lengthwise of the car, comprising supports arranged to embrace one row of automobiles and sustain another;

means for bracing the supports against the sides of the car; and means for bracing the supports lengthwise of the car by means engaging the ends of the car.

15. The system of means for decking automobiles one above another in a plurality of rows extending longthwise of the car, comprising supports arranged to embrace one row of automobiles and sustain another; means for bracing the supports against the sides of the car; means for bracing the supports lengthwise of the car by means engaging the ends of the car; and means for bracing the upper row of automobiles against the top of the car.

16. The system of means for decking automobiles one above the other in a plurality of rows extending lengthwise of the car, comprising supports arranged to embrace one row of automobiles and sustain another; said supports being inclined from bottom to top toward the automobiles; means for bracing the supports transversely of the car including the upper row of cars; and continuous braces joining the supports lengthwise of the car and engaging the ends of the latter.

17. The system of means for decking automobiles one above another in a plurality of rows extending lengthwise of the car, comprising supports arranged to embrace one row of automobiles and sustain another; means for bracing the supports transversely of the car; and inverted V-shaped braces extending from the top of the supports to the top of the car and embracing the automobiles of the top row.

18. The system of means for loading automobiles on freight cars comprising arranging a plurality of automobiles lengthwise of the car in intimate relation; a plurality of unit frames or supports adapted to embrace and support the automobiles, said supports being arranged with their length longitudinally of the car; and means for bracing said supports to one another at appropriate intervals throughout the series of units or supports.

19. The system of means for loading automobiles on freight cars comprising arranging a plurality of automobiles lengthwise of the car in intimate relation; a frame for supporting said automobiles comprising a plurality of units each adapted to support an automobile, said units being arranged to extend lengthwise of the car; and means for joining said units to one another at appropriate intervals throughout the series so as to give rigidity to the supporting frame.

20. Apparatus for loading automobiles on freight cars comprising a pair of rectangular frames, arranged side-by-side transversely of the car, and constituting an automobile supporting unit, a plurality of said units being arranged lengthwise of the car; and means for bracing said units to one another so as to provide a rigid supporting frame.

21. A decking system of the class described, comprising the combination of a freight car having a plurality of spaced supports on each side of the car extending upwardly and inwardly therefrom, and longitudinally extending members connecting said supports.

In witness whereof I have hereunto set my hand on the 20th day of March, 1919.

EUGENE S. BREMERMAN.